United States Patent
Kerber (10) Patent No.: US 12,552,966 B2
(45) Date of Patent: Feb. 17, 2026

(54) ADHESIVE TAPE FOR JACKETING ELONGATE ITEMS SUCH AS MORE PARTICULARLY CABLE HARNESSES AND METHODS FOR JACKETING

(71) Applicant: tesa SE, Norderstedt (DE)

(72) Inventor: Kristin Kerber, Hamburg (DE)

(73) Assignee: Tesa SE, Norderstedt (DE)

( * ) Notice: Subject to any disclaimer, the term of this patent is extended or adjusted under 35 U.S.C. 154(b) by 833 days.

(21) Appl. No.: 17/749,944

(22) Filed: May 20, 2022

(65) Prior Publication Data

US 2022/0372337 A1 Nov. 24, 2022

(30) Foreign Application Priority Data

May 20, 2021 (DE) ...................... 10 2021 205 196.0

(51) Int. Cl.
| | |
|---|---|
| *C09J 7/25* | (2018.01) |
| *B60R 16/02* | (2006.01) |
| *C09J 7/38* | (2018.01) |
| *H01B 13/012* | (2006.01) |

(52) U.S. Cl.
CPC ........... *C09J 7/255* (2018.01); *B60R 16/0215* (2013.01); *C09J 7/385* (2018.01); *H01B 13/01209* (2013.01); *H01B 13/01263* (2013.01)

(58) Field of Classification Search
None
See application file for complete search history.

(56) References Cited

U.S. PATENT DOCUMENTS

| | | |
|---|---|---|
| 4,622,260 A | 11/1986 | Tesch |
| 4,830,188 A | 5/1989 | Hannigan et al. |
| 6,432,529 B1 | 8/2002 | Harder et al. |
| 6,451,146 B1 | 9/2002 | Ganschow et al. |
| 6,541,707 B2 | 4/2003 | Kuelper et al. |
| 6,613,870 B1 | 9/2003 | Harder et al. |
| 6,936,553 B2 | 8/2005 | Von Samson-Himmelstjerna |
| 7,279,541 B2 | 10/2007 | Centner et al. |
| 7,282,250 B2 | 10/2007 | Musahl et al. |
| 9,252,583 B2 | 2/2016 | Wahlers-Schmidlin et al. |
| 9,613,733 B2 | 4/2017 | Siebert et al. |
| 9,725,622 B2 | 8/2017 | Korthals et al. |

(Continued)

FOREIGN PATENT DOCUMENTS

| | | |
|---|---|---|
| BR | PI0504419-7 A | 6/2007 |
| DE | 4313008 C1 | 11/1994 |

(Continued)

OTHER PUBLICATIONS

"Recyceltes PET als Tragermaterial," Coroplast-Internet Site News, Mar. 16, 2021, www.coroplast-tape.com, pp. 1-5.

(Continued)

*Primary Examiner* — Arti Singh-Pandey
(74) *Attorney, Agent, or Firm* — Norris McLaughlin, P.A.

(57) ABSTRACT

An adhesive tape particularly for wrapping cables comprises a textile carrier and a pressure-sensitive adhesive applied on at least one side of the carrier, where starting materials used for the textile carrier comprise fibres of recycled polyethylene terephthalate, where the fraction of the fibres is at least 50 wt % and where the fibres are staple fibres or continuous filaments or are processed to form yarns.

14 Claims, 2 Drawing Sheets

(56) References Cited

U.S. PATENT DOCUMENTS

| | | |
|---|---|---|
| 10,519,345 B2 | 12/2019 | Korthals et al. |
| 2003/0198806 A1 | 10/2003 | Samson-Himmelstjerna et al. |
| 2004/0253889 A1 | 12/2004 | Mundt |
| 2008/0149251 A1 | 6/2008 | Mundt et al. |
| 2011/0067799 A1* | 3/2011 | Mussig ............ C09J 7/38 156/324 |
| 2012/0279637 A1 | 11/2012 | Siebert et al. |
| 2012/0315473 A1 | 12/2012 | Chin |
| 2016/0032150 A1 | 2/2016 | Guenzler et al. |
| 2016/0032156 A1 | 2/2016 | Dollase et al. |
| 2018/0042775 A1 | 2/2018 | Kendrick |
| 2019/0284439 A1 | 9/2019 | Kerep et al. |
| 2020/0199410 A1 | 6/2020 | Leermann |
| 2021/0371708 A1 | 12/2021 | Leermann et al. |
| 2022/0372337 A1 | 11/2022 | Kerber |

FOREIGN PATENT DOCUMENTS

| | | |
|---|---|---|
| DE | 19807752 A1 | 8/1999 |
| DE | 10011788 A1 | 3/2002 |
| DE | 10229527 A1 | 1/2004 |
| DE | 10329994 A1 | 1/2005 |
| DE | 102013205673 A1 | 10/2014 |
| DE | 102013213726 A1 | 1/2015 |
| DE | 202019100588 U1 | 2/2019 |
| EP | 0071212 A2 | 2/1983 |
| EP | 0578151 A1 | 1/1994 |
| EP | 0 995 782 A2 | 4/2000 |
| EP | 1300452 A2 | 4/2003 |
| EP | 1367608 A2 | 12/2003 |
| EP | 1378527 A1 | 1/2004 |
| EP | 1431360 A2 | 6/2004 |
| EP | 1448744 B1 | 8/2004 |
| EP | 1315781 B1 | 1/2005 |
| EP | 1312097 B1 | 11/2006 |
| EP | 1848006 A2 | 10/2007 |
| EP | 2497805 A1 | 9/2012 |
| EP | 2520627 A1 | 11/2012 |
| EP | 2520628 A1 | 11/2012 |
| EP | 2520629 A1 | 11/2012 |
| EP | 2522705 A1 | 11/2012 |
| EP | 2695926 A1 | 2/2014 |
| EP | 3540024 A1 | 9/2019 |
| EP | 3245265 B1 | 7/2020 |
| EP | 4092092 A1 | 11/2022 |
| WO | 2006/015816 A1 | 2/2006 |
| WO | 2006/108871 A1 | 10/2006 |
| WO | 2020/256879 A1 | 12/2020 |

OTHER PUBLICATIONS

Groz-Beckert Magazine, Jul. 2016 https://www.groz-beckert.com/en/news/newsletter/felting/2016/m2_felting_rpet.html.

* cited by examiner

ADHESIVE TAPE FOR JACKETING ELONGATE ITEMS SUCH AS MORE PARTICULARLY CABLE HARNESSES AND METHODS FOR JACKETING

This application claims priority of German Patent Application No. 10 2021 205 196.0 filed May 20, 2021, the entire contents of which are hereby incorporated herein by reference.

The invention pertains to an adhesive tape for jacketing elongate items such as more particularly cable harnesses in motor vehicles, and to methods for jacketing.

For a long time in the industry adhesive tapes have been used for producing cable looms. The adhesive tapes are employed for bundles of a multiplicity of electrical leads, prior to installation or in the already assembled state, in order, for example, to reduce the space occupied by the bundle of leads, by bandaging and additionally to achieve protective functions such as protection from mechanical and/or thermal exposure.

Common forms of adhesive tapes comprise film or fabric carriers coated generally on one side with pressure-sensitive adhesives. Adhesive tapes for the jacketing of elongate items are known for example from EP 1 848 006 A2, DE 10 2013 213 726 A1 and EP 2 497 805 A1.

With film-backed adhesive tapes a certain protection from ingress of fluids is achieved; with lofty and voluminous adhesive tapes based on thick nonwoven or foam as carriers, damping properties are obtained; when stable, abrasion-resistant carrier materials are used, a protective function with respect to scuffing and rubbing is achieved. Particular protection against impact exposure is attained through abrasion-resistant woven fabrics with additionally applied coatings.

Besides the conventional vehicles with internal combustion engines, importance is increasingly being gained by hybrid electric vehicles (HEVs) and by electric cars with a battery (battery electric vehicles, BEVs).

A hybrid electric vehicle is a vehicle with hybrid drive, namely an electric vehicle which is driven by at least one electric motor and also by a further energy converter and which draws energy both from its electrical store (battery) and from a fuel which is carried additionally. A fully electric vehicle is driven exclusively by a battery-operated electric motor and so requires no fossil fuel. The battery is charged via external mains components.

In all motor vehicles, the quantity of electrical leads is increasing as a result of more widespread use of electrical components, while at the same time the space for installation of the harness of leads, particularly in small motor vehicles, is becoming ever smaller. The construction of electric vehicles and hybrid vehicles as well is necessitating more electrical leads. The use of electrical voltages above 42 V requires additional protection of the leads, which are also required, even beyond the normal usage of the vehicle, to ensure protection in specific accident situations.

Within the automotive industry, adhesive tapes for cable jacketing are tested and classified in accordance with extensive bodies of standards such as, for example, LV 312-1 "Protective systems for wiring harnesses in motor vehicles, Adhesive Tapes; Testing Protocol" (10/2009), as a joint standard of the companies Daimler, Audi, B M W and Volkswagen, or the Ford specification ES-XU5T-1A303-aa (revised version 09/2009) "Harness Tape Performance Specification". These standards are identified below in abbreviated form as LV 312 and Ford specification respectively.

The measurements currently are usually based on the proposed amendment to VW 60360-1 "Protective systems for wiring harnesses-Adhesive Tapes": 2019-10.

Cable wrapping tapes with film carriers and fabric carriers, coated generally on one side with various pressure-sensitive adhesives, are widespread. These cable wrapping tapes are required to meet four main requirements.

a. Ease of unwind:
   The product presented in roll form must be easy to unwind, for ease of working.
b. Cable compatibility:
   The cable insulation must not become brittle over prolonged periods through the influence of the adhesive tape in combination with elevated temperature. A distinction is made here according to LV 312 between four temperature classes T1 to T4, corresponding to 80° C. (also called temperature class A), 105° C. (also called temperature class B (105)), 125° C. (also called temperature class C) and 150° C. (also called temperature class D), which the wrapped cables are required to withstand for 3000 h without embrittlement. It is self-evident that temperature classes T3 and T4 place greater demands on the adhesive tape than the lower classes T1 and T2. T1 to T4 classification is decided not only by the cable insulation material but also by the pressure-sensitive adhesive and type of carrier.
c. Chemical compatibility, or compatibility with media in the engine compartment
d. High peel adhesion
   The peel adhesion must be sufficient under flexural stress on uneven, non-uniform substrates such as cable runs, convoluted tubes and branches. Other factors are flexural and tensile stresses in the course of production, installation and subsequent use in the engine compartment of a motor vehicle or else in the vehicle body, with continual flexural stress when doors are opened.

Because the end of the adhesive tape is bonded ideally to its own rear side, there must be good instantaneous peel adhesion (tack) to this substrate, so that there is no flagging of the adhesive tape at the start. In order to ensure a flagging-free product durably, the anchoring on the substrate and the internal strength of the adhesive must both be such that the adhesive bond holds even under the influence of tension (tensile and flexural stressing). In the wrapping of a cable harness, the adhesive tape is bonded with from no overlap at all to complete overlap around the cable, the radius of which is generally small, meaning that the adhesive tape is curved very sharply. At the end of a wrapped section, the tape is typically wrapped primarily onto its own rear side, and so the degree of overlapping is virtually complete, similar to the customary presentation form as an adhesive tape roll, where the adhesive is likewise bonded to its own rear side. In the event of flagging, static forces act, for example, as a result of the flexural stiffness of the carrier and the wrapping tension, which can result in the open ends of adhesive tape standing up undesirably, similar to the start of unaided unwinding. The flagging resistance, then, is the capacity of the adhesive to resist this static force.

Flagging, in the case of an adhesive tape wrapped around a body, means the tendency of one end of the adhesive tape to stick up. The cause lies in a combination of holding power by the adhesive, the stiffness of the carrier, and the diameter of the cable harness.

The flagging resistance of wire harnessing (WH) cable wrapping tapes is verified by way of the TFT (Threshold Flagging Time) method. The target parameter for an outstandingly flagging-free woven fabric product is defined here as a limiting value of well above 1000 min TFT, preferably above 2000 min TFT.

The realization of adhesive tapes which are easy to unwind and at the same time retain good technical adhesive properties poses a major challenge, since the two properties appear to be mutually exclusive. Indeed, the essential criteria in the case of single-sidedly bonding cable wrapping tapes, with adapted unwind force and sufficiently high peel adhesion, go very much against one another. Whereas good peel adhesion values and an associated low flagging potential require good flow-on and anchoring behaviour on the part of the pressure-sensitive adhesive, these criteria tend to be a hindrance to trouble-free unwind performance.

Because a reduction in the unwind force using release agents in the case of textile carrier materials can be realized only at high cost, the plies of adhesive tapes are wound directly onto one another, with the adhesive tape bonding to the rear side of the ply of tape respectively beneath it. In order to ensure unwind without residues of adhesive on the rear side of the carrier, the requirements in terms of a balance between cohesion and adhesion are extremely demanding.

Thus, for example, cable wrapping tapes with pressure-sensitive adhesives based on natural rubber usually exhibit good flagging resistance, but have an unwind force which increases over the storage time and also in the event of increasing temperatures. Furthermore, these tapes meet only the lower temperature classes for cable compatibility.

WO 2006/015816 A1 discloses pressure-sensitive adhesives based on synthetic rubber with photoinitiators. EP 1 431 360 A2 discloses adhesives tapes which can be wound onto themselves, comprising a thermally consolidated non-woven having a basis weight of 10 to 50 g/m$^2$ and UV-crosslinked acrylate adhesive. Also known are woven fabric adhesive tapes which are based on a crosslinked acrylate hotmelt, usually an all-acrylate system and which according to LV 312 are classified in temperature class D (150° C.). They exhibit low adhesive anchoring and result in transfer of adhesive on smooth carrier surfaces. Also known are woven fabric adhesive tapes which are based on an acrylate dispersion and are classified according to LV 312 in temperature class D (150° C.). Likewise known are nonwoven adhesive tapes which are based on a crosslinked acrylate hotmelt, usually all-acrylate system, and which according to LV 312 are classed in temperature class C (125° C.). All the woven fabric products here possess the same adhesive, which is adjusted to the particular requirements through coatweight and UV crosslinking. A disadvantage in their application on the cable harness are the markedly upstanding tape ends, when these standard-range adhesive tapes are mounted on critical wrappings such as branches, transitions, small diameters, etc. While the level of their unwind force can be controlled well by means of the selected coatweight and especially UV crosslinking, this nevertheless entails the unwanted side effects of significantly decreasing peel adhesions and an incalculable risk of flagging. Moreover, acrylate hotmelt adhesives can be blended, for incorporation of resins or fillers, only under more difficult conditions. The use of fillers in the context of adhesive compound design is known against the background of a cost saving.

Plasticizers are added to plastics such as cable jackets or cable sheaths in order to provide them with long-term flexibility, suppleness and elasticity. Plasticizers may be low-volatility resins, esters or oils.

The function of the plasticizers is to shift the thermoplastic range towards lower temperatures. Known plasticizers include, for example, DOP (dioctyl phthalate, di-2-ethylhexyl phthalate), DINP (diisononyl phthalate), TOTM (trioctyl trimellitate) or DIDP (diisodecyl phthalate).

Frequently employed are external plasticizers, which are not bound covalently into the polymer but instead interact with the polymer via polar groups, in order to enable mobility of the polymeric chains, such as, for example, diethylhexyl phthalate (DEHP), dioctyl phthalate (DOP) as plasticizers for PVC and elastomers. Other plasticizers comprise citric acid-based plasticizers such as triethyl citrate or adipic acid-based plasticizers such as diethylhexyl adipate and diethyloctyl adipate. The diffusion of these external plasticizers from the plastics of the cable insulation can be reduced significantly by the adhesive tapes of the invention with pressure-sensitive adhesives.

Internal plasticizers are understood to be those which are present during the copolymerization and are copolymerized, and are subsequently unable to diffuse out of the polymer.

Acrylate adhesives generally have a very high affinity for the usual PVC plasticizers, resulting in a strong tendency towards migration of the so-called monomer plasticizers such as DINP, DIDP or TOTM, for example. It is also known that when PVC-insulated cable leads are used, there is severe plasticizer migration over time, an especially under temperature load, up to the point where an equilibrium is established between insulation and adhesive tape or adhesive. The result is an unwanted embrittlement of the cable sheathing/cable insulation. In combination with ageing effects (oxidation, loss of plasticizer to the surroundings, degradation, mechanical loads, etc.), increased plasticizer migration results in premature failure of the cable insulation through embrittlement. For plasticized PVC, this is also known as the "brittle gap".

For the purpose of reducing or preventing plasticizer migration there are primarily two known measures: thus a) the equilibrium may be made the focus, with plasticizer being added to the adhesive during the production process itself. This, however, frequently leads to far-reaching changes in the technical adhesive properties, up to the point of complete cohesive failure of the adhesive. Alternatively b) in order to erect an effective barrier, close-meshed cross-linking of the adhesive can be undertaken, albeit again possibly with dramatic consequences for the technical adhesive aspects, or else finely divided fillers can be used that are capable of constructing a network.

The object on which the present invention is based is that of providing an adhesive tape with unwind forces which are adjustable over a relatively broad spectrum, i.e. which features ease of unwind, which exhibits high cable compatibility over all of the stated temperature classes for applications in the cable bandaging segment (wire harnessing (WH) applications), namely an excellent compatibility with all common cable insulation systems, especially according to the reference spectrum of cables in LV 312, and which enables the particularly simple, inexpensive and rapid jacketing of elongate items such as cable harnesses in motor vehicles.

This object is achieved by means of an adhesive tape as recorded in the main claim. The dependent claims provide advantageous developments of the adhesive tape and methods for employing the adhesive tape.

The invention relates accordingly to an adhesive tape especially for wrapping cables, comprising a textile carrier and a pressure-sensitive adhesive applied on at least one side of the carrier.

Suitable carriers include in principle all textile carrier materials, preference being given to stitchbonded fabrics, these being textile sheetlike structures produced by looping of incorporated knitting threads into a sheetlike base material, and particular preference being given to stitchbonded nonwovens, these being textile sheetlike structures with fibre nonwoven as base material, which are consolidated by looping of incorporated knitting threads (Maliwatt is an example).

The term "textile carrier" or "textile sheetlike structure" encompasses all known textile carriers such as knitted fabrics, scrims, tapes, braids, tufted textiles, felts, woven fabrics (encompassing plain weave, twill and satin weave), knitted fabrics (encompassing warp knits and other knits) or nonwovens, the term "nonwoven" comprehending at least textile sheetlike structures according to EN 29092 (1988) and also stitchbonded nonwovens and similar systems.

The stitchbonded fabrics also include thread course stitchbonded fabrics, these being textile sheetlike structures having one or more thread courses laid over one another as base material, which are consolidated by looping of incorporated knitting threads, with Florofol as an example; pile thread stitchbonded fabrics, these being textile sheetlike structures in which knitting threads are incorporated in pile form into a base material by means of looping, with Malipol being an example; and weft pile stitchbonded fabrics, these being textile sheetlike structures in which unlooped threads in pile form are attached by knitting threads by means of looping to a base material, with Schusspol being one example.

Also preferred, furthermore, are knit-bonded nonwovens, these being textile sheetlike structures produced without using threads, by formation of fibre loops from primary fibre nonwoven. They include fibre-based knit-bonded nonwovens, these being textile sheetlike structures composed of fibre nonwoven with a consolidating fibre loop side and a side having fibres arranged horizontally to the fibre loop layer, where fibres from the fibre nonwoven are formed into fibre loops, with Malivlies as an example; pile fibre-based knit-bonded nonwovens, these being textile sheetlike structures composed of fibre nonwoven with or without use of a base material, which consist of a fibre loop side and also a pile fibre side with fibres arranged almost perpendicular to the fibre loop layer, with Voltex, Kunit or Maliknit as examples; and loop-based knit-bonded nonwovens, these being textile sheetlike structures composed of a pile fibre-based knit-bonded nonwoven in which a second fibre loop layer has been formed from the pile fibres, with Multiknit or Optiknit as examples.

The above definitions are taken from DIN 61211:2005-05.

It is likewise possible to use woven and knitted spacer fabrics with lamination.

Knitted spacer fabrics represent double-faced textiles in which the warp-knitted fabric faces are distanced by connecting spacer threads, referred to as pile threads. The knitted spacer fabrics are loop fabrics or knitted fabrics extended to include the third dimension. Woven spacer fabrics likewise possess two layers of woven fabric arranged with spacing, the layers being spaced apart by filaments or threads or fibres. Woven spacer fabrics of this kind are disclosed in EP 0 071 212 B1.

Suitable nonwovens include consolidated staple fibre nonwovens and also filament, meltblown and spunbonded nonwovens, which generally require additional consolidation. Possible methods of consolidation known for nonwovens are mechanical, thermal and chemical consolidation. If with mechanical consolidation the fibres are held together purely mechanically, usually by entanglement of the individual fibres, by interlooping of fibre bundles or by stitching-in of additional threads, it is possible by thermal and by chemical techniques to obtain adhesive (with binder) or cohesive (binderless) fibre-fibre bonds. Given appropriate formulation and an appropriate process regime, these bonds can be restricted exclusively or at least predominantly to fibre nodal points, so that a stable, three-dimensional network is formed while nevertheless retaining the loose, open structure in the nonwoven.

Nonwovens having proved to be particularly advantageous are those consolidated in particular by overstitching with separate threads or by interlooping.

Consolidated nonwovens of this kind are produced for example on stitchbonding machines of the "Malimo" from Karl Mayer, formerly Malimo, and can be obtained from companies including Techtex GmbH. A Malivlies is characterized in that a cross-laid fibre nonwoven is consolidated by the formation of loops from fibres of the nonwoven.

The carrier used may additionally be a nonwoven of the Kunit or Multiknit type. A Kunit nonwoven is characterized in that it originates from the processing of a longitudinally oriented fibre nonwoven to form a sheetlike structure which has loops on one side and has loop feet or pile fibre folds on the other side, but possesses neither threads or prefabricated sheetlike structures. A nonwoven of this kind as well has been produced for a relatively long time already, on stitchbonding machines of the "Malimo" type from Karl Mayer, for example. A further characterizing feature of this nonwoven is that as a longitudinal fibre nonwoven it is able to absorb high tensile forces in the longitudinal direction. The characteristic feature of a Multiknit nonwoven relative to the Kunit nonwoven is that the nonwoven is consolidated on both the top and bottom sides by the double-sided needle punching. The starting product used for a Multiknit generally comprises one or two single-sidedly interlooped pile fibre-based knit-bonded nonwovens produced by the Kunit process. In the end product, both facing sides of the nonwoven are shaped by fibre interlooping to form a closed surface, and are joined to one another by fibres which stand almost perpendicularly. There is the additional possibility of incorporating further punchable sheetlike structures and/or scatterable media.

Also particularly suitable, lastly, are stitchbonded nonwovens. A stitchbonded nonwoven is formed from a nonwoven material with a multiplicity of stitches running parallel to one another. These stitches are formed by the stitching-in or stitch-knitting of continuous textile threads. For this type of nonwoven (also known as a Maliwatt), stitchbonding machines of the "Malimo" type from Karl Mayer are known.

Also suitable are needlefelt webs. With the needlefelt web, a tuft of fibres is made into a sheetlike structure by means of needles provided with barbs. By alternate introduction and withdrawal of the needles, the material is consolidated on a needle bar, with the individual fibres interlooping to form a firm sheetlike structure. The number and configuration of the needling points (needle shape, penetration depth, double-sided needling) determine the thickness and strength of the fibre structure, which are in general lightweight, air-permeable and elastic.

Additionally advantageous is a staple fibre nonwoven which is mechanically preconsolidated in the first step or is a wetlaid web laid hydrodynamically in which between 2 wt % and 50 wt % of the fibres of the web are fusible fibres, more particularly between 5 wt % and 40 wt % of the fibres of the web.

A nonwoven of this kind is characterized in that the fibres are laid wet or, for example, a staple fibre nonwoven is preconsolidated by the formation of loops from fibres of the nonwoven by means of needling, stitching, airjet and/or waterjet processing.

In a second step, thermofixing takes place, with the strength of the nonwoven being increased again by the melting, or partial melting, of the fusible fibres.

For the utilization of nonwovens, the adhesive consolidation of mechanically preconsolidated or wetlaid nonwovens is of particular interest, and this consolidation may take place via the addition of binder in solid, liquid, foamed or pastelike form. A great diversity of theoretical presentation forms is possible: for example, solid binders as powder for trickling in; as a sheet or as a mesh; or in the form of binding fibres. Liquid binders can be applied as solutions in water or organic solvents, or as a dispersion. For adhesive consolidation, binding dispersions are predominantly selected: thermosets in the form of phenolic or melamine resin dispersions, elastomers as dispersions of natural or synthetic rubbers, or, usually, dispersions of thermoplastics such as acrylates, vinyl acetates, polyurethanes, styrene-butadiene systems, PVC, and the like, and also copolymers thereof. Normally the dispersions are anionic or nonionically stabilized dispersions, although in certain cases cationic dispersions may also be advantageous.

The binder may be applied in a manner which is in accordance with the prior art and for which it is possible to consult, for example, standard works of coating or of nonwoven technology such as "Vliesstoffe" (Georg Thieme Verlag, Stuttgart, 1982) or "Textiltechnik-Vliesstofferzeugung" (Arbeitgeberkreis Gesamttextil, Eschborn, 1996).

For mechanically preconsolidated nonwovens which already possess sufficient composite strength, the single-sided spray application of a binder is appropriate for producing specific changes in surface properties.

Such a procedure not only is sparing in its use of binder but also significantly reduces the energy requirement for drying. Because there is no need for squeeze rolls and because the dispersions remain predominantly in the upper region of the nonwoven, unwanted hardening and stiffening of the nonwoven can be largely prevented.

For sufficient adhesive consolidation of the nonwoven carrier, the addition of binder in the order of magnitude of 1% to 50%, more particularly 3% to 20%, based on the weight of the fibre nonwoven, is generally required.

The binder may be added as early as during nonwoven manufacture, in the course of mechanical preconsolidation, or else in a separate process step, which may be carried out in-line or off-line. Following the addition of binder, it is necessary temporarily to generate a condition for the binder in which it becomes adhesive and adhesively connects the fibres—this may be achieved during the drying, for example, of dispersions, or else by heating, with further possibilities for variation existing by way of whole-surface or partial application of pressure. The binder may be activated in known drying tunnels, given an appropriate selection of binder, or else by means of infrared radiation, UV radiation, ultrasound, high-frequency radiation or the like.

A further special form of adhesive consolidation involves activating the binder by partial dissolution or partial swelling. In this case it is also possible in principle for the fibres themselves, or admixed special-purpose fibres, to take over the function of the binder. Since, however, such solvents are objectionable on environmental grounds, and/or are problematic in their handling, for the majority of polymeric fibres, this process is not often employed.

Advantageously and at least in regions, the carrier may have a single-sidedly or double-sidedly polished surface, preferably in each case a surface polished over the whole area. The polished surface may be chintzed, as elucidated in detail in EP 1 448 744 A1, for example.

Furthermore, the carrier may be compacted by calendaring on a roll mill. The two rolls preferably run in opposite directions and at the same peripheral speed, causing the carrier to be pressed and compacted.

If there is a difference in the peripheral speed of the rollers, then the carrier is additionally polished.

The carrier may be a woven fabric.

Particularly preferred woven fabrics are constructed as follows:
    the thread count in the warp is 10 to 60/cm
    the thread count in the weft is 10 to 40/cm
    the warp threads possess a yarn weight of between 40 and 400 dtex, more particularly between 44 and 330 dtex, very preferably of 167 dtex
    the weft threads possess a yarn weight of between 40 and 660 dtex, more, particularly between 44 and 400 dtex, very preferably of 167 dtex.

According to a further advantageous embodiment of the invention, the thread count in the warp is 40 to 50/cm, preferably 44/cm.

According to a further advantageous embodiment of the invention, the thread count in the weft is 18 to 22/cm, preferably 20/cm.

According to a further advantageous embodiment of the invention, the woven fabric is a woven polyester fabric or a woven blend fabric made from polyester and polyamide or viscose.

With further preference the thickness of the woven fabric is not more than 300 μm, more preferably 170 to 230 μm, very preferably 190 to 210 μm.

The carrier, according to a further advantageous embodiment of the invention, has a basis weight of up to 200 g/m$^2$, preferably 100 to 150 g/m$^2$.

Starting materials employed for the carrier material of the adhesive tape are (manmade) fibres (staple fibre or continuous filament) made from recycled polyethylene terephthalate. The fraction of the recycled fibres in the carrier material is at least 50 wt %, preferably more than 50 wt %, more preferably 70 wt % or more, more preferably 90 wt % or more, more preferably 100 wt %.

The admixed charge of (manmade) fibres (staple fibre or continuous filaments) encompasses synthetic polymers, also called synthetic fibres, made of polyester (for example polyethylene terephthalate), polyamide, polyimide, aramid, polyolefin, polyacrylonitrile or glass, or (manmade) fibres made from natural polymers such as cellulosic fibres (viscose, modal, lyocell, cupro, acetate, triacetate, cellulon), such as rubber fibres, such as plant protein fibres and/or such as animal protein fibres, and/or natural fibres made of cotton, sisal, flax, silk, hemp, linen, coconut or wool. The present invention, however, is not confined to the materials stated; it is instead possible, as evident to the skilled person without having to take an inventive step, to use a multiplicity of further fibres in the second charge.

Likewise suitable, furthermore, are yarns fabricated from the specified fibres.

The additional stitching threads required in the case, for example, of a stitchbonded nonwoven may consist of the stated polymers. Preferred stitching threads are those of (recycled) polyethylene terephthalate or polyamide.

In the case of woven fabrics or scrims, individual threads may be produced from a blend yarn. Generally speaking, however, the warp threads and the weft threads are each formed of a single kind.

The warp threads and/or the weft threads may consist 100 wt % of synthetic threads of recycled polyethylene terephthalate. It is also possible for only the warp threads or only the weft threads to consist 100 wt % of synthetic threads of recycled polyethylene terephthalate, in which case the fraction of the recycled fibres in the woven fabric must be at least 50 wt %.

The yarns or threads of the woven fabrics may take the form of filaments. For the purposes of this invention, a filament refers to a bundle of parallel individual linear fibres/filaments, often also referred to as a multifilament in the literature. This fibre bundle may optionally be given inherent strengthening by torsion, and is then referred to as spun, folded or twisted filament. Alternatively the fibre bundle may be given inherent strengthening by entangling using compressed air or water jets. In the text below, for all of these embodiments, only the term "filament" is used, in a generalizing way.

The filament may be textured or flat and may have point strengthening or no strengthening.

The material used for the textile carrier is recycled polyethylene terephthalate, owing to the outstanding ageing resistance and the outstanding media resistance with respect to chemicals and service media such as oil, petrol, antifreeze and the like. Recycled polyethylene terephthalate, moreover, has the advantage of leading to a highly abrasion-resistant and temperature-stable carrier, this being particularly important for the specific end use for the bundling of cables in motor vehicles and, for example, in the engine compartment.

The fibres of recycled polyethylene terephthalate are produced in particular primarily from recycled PET bottles and optionally from recycled secondary products of the polyester industry. The reuse of the used PET raw materials makes the carriers sustainable, eco-friendly products. In this case the raw materials do not undergo emission-generating waste processing, and nor do they pollute the environment in the form of plastics in the ocean or in the countryside.

For the preparation of the fibres, the raw material, more particularly the PET bottles, is washed mechanically, similar to the laundering operation in a washing machine.

Thereafter the raw material is comminuted mechanically, producing the material referred to as "flakes". These flakes are subsequently melted and processed to form fibres.

The fibres, particularly those used to form nonwovens, preferably have a linear fibre density of 2 to 5 denier and/or a fibre length of 30 to 90 mm.

The stitching thread number is preferably in the range from 15 to 25 threads/25 mm.

The basis weight of the textile carrier is advantageously between 30 g/m² and 300 g/m², with the two stated limiting values explicitly being encompassed by the range indication (this is also the case, mutatis mutandis, for all parameter ranges given below), more advantageously between 50 g/m² and 200 g/m², very advantageously between 50 g/m² and 150 g/m², especially advantageously between 70 g/m² and 130 g/m².

In the case of woven fabrics the basis weight is preferably 100 g/m² to 150 g/m², more particularly 130 g/m². In the case of nonwovens the basis weight is preferably 50 g/m² to 200 g/m², more preferably 70 g/m² to 180 g/m².

With further preference the textile carriers have a flexural stiffness in the range from 0 to mN/60 mm as unprocessed carriers (MD, machine direction), optionally from 2 to mN/60 mm as unprocessed carriers (MD), resulting in very good flagging-free products.

The adhesive coatweight, based on the carrier area, is preferably between 40 and 160 g/m², more preferably between 50 and 100 g/m², more preferably still between 60 and 90 g/m².

For the adhesive it is possible to employ all known adhesive systems. Besides adhesives based on natural or synthetic rubber, it is possible in particular to use silicone adhesives and also polyacrylate adhesives.

If there are further layers of adhesive on the exposed surfaces of the first or second carrier, they may also be selected from the adhesives below.

The adhesive is preferably a pressure-sensitive adhesive (PSA), in other words an adhesive which even under relatively weak applied pressure allows durable bonding to virtually all substrates and which after use can be detached from the substrate again substantially without residue. A PSA has a permanently pressure-sensitive adhesive effect at room temperature, in other words possessing sufficiently low viscosity and a high tack, and so the surface of the bonding substrate in question is wetted even with low applied pressure. The bondability of the adhesive derives from its adhesive properties, and the redetachability from its cohesive properties.

PSAs may be viewed as liquids of extremely high viscosity with an elastic component. PSAs accordingly have particular, characteristic viscoelastic properties which result in the permanent inherent tack and adhesiveness.

A characteristic of PSAs is that when they are mechanically deformed, there are processes of viscous flow and there is also development of elastic forces of resilience. The two processes have a certain relationship to one another in terms of their respective proportion, in dependence not only on the precise composition, the structure and the degree of crosslinking of the respective PSA, but also on the rate and duration of the deformation, and on the temperature.

The proportional viscous flow is necessary for the attainment of adhesion. Only the viscous components, brought about by macromolecules with relatively high mobility, permit effective wetting and effective flow onto the substrate where bonding is to take place. A high viscous flow component results in high tack (also referred to as surface stickiness) and hence often also in a high peel adhesion. Highly crosslinked systems, crystalline polymers or polymers with glasslike solidification lack flowable components and are therefore in general devoid of pressure-sensitive adhesiveness or at least possess only little pressure-sensitive adhesiveness.

The proportional elastic forces of resilience are necessary for the attainment of cohesion. They are brought about, for example, by very long-chain macromolecules with a high degree of coiling, and also by physically or chemically crosslinked macromolecules, and they permit the transmission of the forces that act on an adhesive bond. They enable an adhesive bond to withstand a long-term load acting on it, in the form of a long-term shearing load, for example, to a sufficient extent over a relatively long time period.

Particularly preferred is a PSA in the form of a dried polymer dispersion, the polymer having been synthesized from:
(a) 95.0 to 100.0 wt % of n-butyl acrylate and/or 2-ethylhexyl acrylate
(b) 0.0 to 5.0 wt % of an ethylenically unsaturated monomer having an acid or acid anhydride function.

The polymer consists preferably of 95.0 to 99.5 wt % of n-butyl acrylate and/or 2-ethylhexyl acrylate and 0.5 to 5 wt % of an ethylenically unsaturated monomer having an acid or acid anhydride function, more preferably of 97.0 or 98.0 wt % to 99.0 wt % of n-butyl acrylate and/or 2-ethylhexyl acrylate and 1.0 to 2.0 wt % or 3 wt % of an ethylenically unsaturated monomer having an acid or acid anhydride function.

Besides the acrylate polymers recited, and besides any residual monomers present, the PSA may additionally be admixed with tackifiers and/or adjuvants such as light stabilizers or ageing inhibitors.

In particular there are no further polymers such as elastomers present in the PSA, meaning that the polymers of the PSA consist only of the monomers (a) and (b) in the proportions indicated.

The monomer (a) is preferably formed by n-butyl acrylate.

Examples of monomers contemplated as (b) advantageously include acrylic acid, methacrylic acid, itaconic acid, maleic acid, fumaric acid and/or maleic anhydride.

Preference is given to (meth)acrylic acid of the formula I, (I)

where $R^3$ is H or $CH_3$; preference is given optionally to using the mixture of acrylic acid or methacrylic acid. Acrylic acid is particularly preferred.

According to one particularly preferred variant, the composition of the polymer is as follows:
(a) 95.0 to 100.0 wt %, preferably 95.0 to 99.5 wt %, more preferably 98.0 to 99.0 wt % of n-butyl acrylate and
(b) 0.0 to 5.0 wt %, preferably 0.5 to 5.0 wt %, more preferably 1.0 to 2.0 wt % of acrylic acid.

The polymer dispersion is prepared by the process of emulsion polymerization of the stated components. Descriptions of this process can be found for example in "Emulsion Polymerization and Emulsion Polymers" by Peter A. Lovell and Mohamed S. El-Aasser-Wiley-VCH 1997-ISBN 0-471-96746-7 or in EP 1 378 527 B1.

During the polymerization it cannot be ruled out that not all of the monomers undergo reaction to form polymers. It is obvious here that the residual monomer content is to be as small as possible.

Preference is given to providing adhesives comprising the polymer dispersion with a residual monomer content of less than or equal to 1 wt %, more particularly less than or equal to 0.5 wt % (based on the mass of the dried polymer dispersion).

A "tackifier resin" is understood, in accordance with the general understanding of the skilled person, to refer to an oligomeric or polymeric resin which raises the autoadhesion (the tack, the inherent adhesiveness) of the PSA by comparison with the PSA that is otherwise identical but contains no tackifier resin.

The use of tackifiers for boosting the peel adhesion values of PSAs is known in principle. This effect also comes about if the adhesive is admixed with up to 15 parts by weight (corresponding to <15 parts by weight), or 5 to 15 parts by weight, of tackifier (based on the mass of the dried polymer dispersion). Preference is given to adding 5 to 12, more preferably 6 to 10, parts by weight of tackifier (based on the mass of the dried polymer dispersion).

Suitability as tackifiers, also referred to as tackifier resins, is possessed in principle by all known classes of compound. Tackifiers are, for example, hydrocarbon resins (for example polymers based on unsaturated $C_5$ or $C_9$ monomers), terpene-phenolic resins, polyterpene resins based on raw materials such as, for example, α- or β-pinene, aromatic resins such as coumarone-indene resins or resins based on styrene or α-methylstyrene such as rosin and its derivatives, for example disproportionated, dimerized or esterified rosin, for example reaction products with glycol, glycerol or pentaerythritol, to name but a few. Preferred resins are those without readily oxidizable double bonds, such as terpene-phenolic resins, aromatic resins and, very preferably, resins produced by hydrogenation, such as, for example, hydrogenated aromatic resins, hydrogenated polycyclopentadiene resins, hydrogenated rosin derivatives or hydrogenated polyterpene resins.

Resins based on terpene phenols and rosin esters are preferred. Likewise preferred are tackifier resins having a softening point of more than 80° C. according to ASTM E28-99 (2009). Particularly preferred are resins based on terpene phenols and rosin esters having a softening point of more than 90° C. according to ASTM E28-99 (2009). The resins are usefully employed in dispersion form. In that way they can easily be mixed in finely divided form with the polymer dispersion.

Particularly preferred is the variant wherein no tackifier resins at all have been added to the PSA.

In particular, the PSA is not admixed with the following substances:
hydrocarbon resins (for example polymers based on unsaturated $C_5$ or $C_9$ monomers)
terpene-phenolic resins
polyterpene resins based on raw materials such as, for example, α- or β-pinene
aromatic resins such as coumarone-indene resins or resins based on styrene or α-methylstyrene such as rosin and its derivatives, for example disproportionated, dimerized or esterified rosin, for example reaction products with glycol, glycerol or pentaerythritol.

On account of their particular suitability as an adhesive for adhesive tapes of automotive cable harnesses, in respect of freedom from fogging, preference is given to solvent-free acrylate hotmelt compounds, of the kind described in more detail in DE 198 07 752 A1 and also in DE 100 11 788 A1.

Fogging (see DIN 75201 A) denotes the effect where under adverse circumstances compounds of low molecular mass may outgas from the adhesive tapes and condense on cold parts. This may result in the view through the windscreen, for example, becoming impaired.

A suitable adhesive is an acrylate hotmelt-based adhesive having a K value of at least 20, more particularly greater than 30 (measured in each case in 1 wt % solution in toluene, 25° C.) and obtainable by concentrating a solution of such an adhesive to form a system which can be processed as a hotmelt.

The concentrating process may take place in appropriately equipped vessels or extruders; especially in the case of accompanying degassing, a venting extruder is preferred.

One such adhesive is set out in DE 43 13 008 C2. In an intermediate step, the solvent is removed entirely from these acrylates s produced in this way.

The K value here is determined in particular in analogy to DIN 53 726.

Additionally here, further volatile constituents are removed. After coating from the melt, these adhesives have only small fractions of volatile constituents. Hence it is possible to adopt all of the monomers/formulas that are claimed in the patent referred to above.

The solution of the adhesive may comprise 5 to 80 wt %, more particularly 30 to 70 wt %, of solvents.

Preference is given to using commercial solvents, particularly low-boiling hydrocarbons, ketones, alcohols and/or esters.

It is preferred, moreover, to use single-screw, twin-screw or multi-screw extruders having one or, in particular, two or more venting units.

The acrylate hotmelt-based adhesive may have had benzoin derivatives incorporated into it by copolymerization, examples being benzoin acrylate or benzoin methacrylate, acrylic or methacrylic esters. Benzoin derivatives of these kinds are described in EP 0 578 151 A. The acrylate hotmelt-based adhesive may be UV-crosslinked. Other modes of crosslinking are also possible, however, an example being electron beam crosslinking.

In another preferred embodiment, self-adhesive compounds used are copolymers of (meth)acrylic acid and esters thereof having 1 to 25 carbon atoms, maleic, fumaric and/or itaconic acid and/or their esters, substituted (meth)acrylamides, maleic anhydride, and other vinyl compounds, such as vinyl esters, more particularly vinyl acetate, vinyl alcohols and/or vinyl ethers.

The residual solvent content ought to be below 1 wt %.

One adhesive which is found to be particularly suitable is a low molecular mass, pressure-sensitive, acrylate hotmelt adhesive, of the kind stocked under the name acResin UV or Acronal®, especially acResin A 260UV, by BASF. This adhesive with a low K value acquires its practical properties as a result of a concluding crosslinking procedure initiated chemically by radiation.

Other outstandingly suitable adhesives are described in EP 3 540 024 A1, EP 2 520 627 A1, EP 2 522 705 A1, EP 2 520 628 A1, EP 2 695 926 A1 and EP 2 520 629 A1.

The adhesive coating likewise preferably consists of an adhesive based on synthetic rubber, more particularly, in fact, an adhesive comprising at least one vinyl aromatic block copolymer and at least one tackifying resin. Typical concentrations of use for the block copolymer lie in a concentration in the range between 30 wt % and 70 wt %, more particularly in the range between 35 wt % and 55 wt %.

Further polymers which may be present are those based on pure hydrocarbons such as, for example, unsaturated polydienes, such as natural or synthetically produced polyisoprene or polybutadiene, chemically substantially saturated elastomers such as, for example, saturated ethylene-propylene copolymers, α-olefin copolymers, polyisobutylene, butyl rubber, ethylene-propylene rubber, and also chemically functionalized hydrocarbons such as, for example, halogen-containing, acrylate-containing or vinyl ether-containing polyolefins, which may replace up to half of the vinyl aromatic-containing block copolymers.

Serving as tackifiers are tackifier resins which are compatible with the elastomer block of the styrene block copolymers.

Plasticizing agents typically employed are those such as, for example, liquid resins, plasticizer oils or low molecular mass liquid polymers such as, for example, low molecular mass polyisobutylenes having molar masses <1500 g/mol (number average) or liquid EPDM grades.

To all the stated types of adhesives it is possible to add further additives in the form of light stabilizers such as, for example, UV absorbers, sterically hindered amines, antiozonants, metal deactivators, processing assistants, and end-block-reinforcing resins.

Fillers such as, for example, silicon dioxide, glass (ground or in the form of spheres, as solid or hollow spheres), microballoons, aluminium oxides, zinc oxides, calcium carbonates, titanium dioxides, carbon blacks, silicates and chalk, to name but a few, and also colour pigments and dyes, and optical brighteners as well, may likewise be used.

It is common to add primary and secondary antioxidants to PSAs in order to improve their ageing stability. Primary antioxidants react with oxy and peroxy radicals, which may form in the presence of oxygen, and react with them to form less reactive compounds. Secondary antioxidants reduce hydroperoxides, for example, into alcohols. There is a known synergistic effect between primary and secondary ageing inhibitors, and so the protective effect of a mixture is frequently greater than the sum of the two individual effects.

If there is a wish for the adhesive tape described to be of low flammability, this quality can be achieved by adding flame retardants to the carrier and/or to the adhesive. These retardants may be organobromine compounds, if required with synergists such as antimony trioxide, although, with regard to the absence of halogen from the adhesive tape, preference will be given to using red phosphorus, organophosphorus compounds, mineral compounds or intumescent compounds such as ammonium polyphosphate, alone or in conjunction with synergists.

The PSAs may be produced and processed from solution, from dispersion and also from the melt. Preferred production and processing methods take place from the melt. For the latter case, suitable production operations encompass both batch processes and continuous processes.

The general expression "adhesive tape" in the context of this invention encompasses all sheetlike structures such as two-dimensionally extended films or film sections, tapes with extended length and limited width, tape sections and the like, and also, lastly, diecuts or labels.

The adhesive tape therefore has a longitudinal extent and a latitudinal extent. The adhesive tape also has a thickness, extending perpendicularly to both extents, with the latitudinal extent and longitudinal extent being multiple times greater than the thickness. The thickness is very largely the same, preferably exactly the same, over the entire superficial extent of the adhesive tape as defined by length and width.

The adhesive tape takes the form in particular of a sheet web. A sheet web is an object whose length is multiple times greater than the width, with the width being approximately and preferably exactly the same along the entire length.

The adhesive tape may be produced in the form of a roll, in other words rolled up onto itself in the form of an Archimedean spiral.

Applied to the exposed top side of the first carrier may be a reverse-face varnish (functional layer), in order to exert a favourable influence on the unwind properties of the adhesive tape wound into the Archimedean spiral. This reverse-face varnish may for this purpose comprise silicone compounds or fluorosilicone compounds and also polyvinylstearylcarbamate, polyethyleniminestearylcarbamide or organofluorine compounds as dehesive substances.

The adhesive may be applied in a longitudinal direction of the adhesive tape, in the form of a stripe the width of which is lower than that of the first carrier.

Depending on the particular utility, there may also be a plurality of parallel stripes of the adhesive coated on the carrier material.

The position of the stripe on the carrier is freely selectable, with preference being given to an arrangement directly at one of the edges of the carrier.

The adhesive is preferably applied over the full area of the first carrier.

Provided on the adhesive coating of the carrier there may be at least one stripe of a covering, extending in a longitudinal direction of the adhesive tape and covering between 20% and 90% of the adhesive coating.

The stripe preferably covers in total between 50% and 80% of the adhesive coating. The degree of coverage is selected according to the application and to the diameter of the cable harness.

The percentages stated relate to the width of the stripes of the covering in relation to the width of the carrier.

According to one preferred embodiment of the invention there is exactly one stripe of the covering present on the adhesive coating.

The position of the stripe on the adhesive coating is freely selectable, with preference being given to an arrangement directly at one of the longitudinal edges of the carrier. In this way an adhesive strip is produced which extends in a longitudinal direction of the adhesive tape and finishes at the other longitudinal edge of the carrier.

Where the adhesive tape is used for jacketing a cable loom, by the adhesive tape being guided in a helicoidal movement around the cable loom, the sheathing of the cable loom may be accomplished by bonding the adhesive of the adhesive tape only to the adhesive tape itself, with the item not coming into contact with any adhesive.

The cable loom thus jacketed has a very high flexibility, owing to the absence of fixing of the cable by any adhesive. Accordingly the flexibility of the cable on installation-particularly in narrow passages or sharp bends—is significantly increased.

If a certain fixing of the adhesive tape on the item is desired, the jacketing may be accomplished by bonding part of the adhesive stripe to the adhesive tape itself and another part to the item.

According to another advantageous embodiment, the stripe is applied centrally on the adhesive coating, thereby producing two adhesive stripes extending on the longitudinal edges on the carrier in a longitudinal direction of the adhesive tape.

For the secure and economic application of the adhesive tape in said helicoidal movement around the cable loom, and to counter the slipping of the resultant protective sheathing, the two adhesive stripes each present on the longitudinal edges of the adhesive tape are advantageous, especially if one stripe, which is usually narrower than the second stripe, serves as a fixing aid, and the second, broader stripe serves as a fastener. In this way the adhesive tape is bonded on the cable in such a way that the cable harness is secured against slipping but is nevertheless flexible in design.

In addition there are embodiments in which more than one stripe of the covering is applied on the adhesive coating. Where reference is made only to one stripe, the skilled person reads this, conceptually, as accommodating the possibility that there may well also be two or more stripes covering the adhesive coating at the same time.

The procedure for producing the adhesive tape of the invention involves nothing more than the coating of the carrier directly with the dispersion in one or more successive operations. In the case of textile carriers, the untreated textile may be coated directly or by a transfer process. Alternatively the textile may be pretreated with a coating (using any desired film-forming substance, from solution, dispersion, melt and/or radiation-curing), in order to then be provided, in a downstream operation, directly or by a transfer process, with the PSA. Application assemblies used are the customary ones: wire doctor blade, coating bar, roll application, nozzle coating, twin-chamber doctor blade, multiple cascade die.

According to one preferred embodiment of the invention, the adhesive after application to the carrier has been absorbed into the carrier to an extent of more than 10%, preferably more than 25%, more preferably more than 50%. A numerical value of 25%, for example, means here that the adhesive has penetrated over a layer thickness of 25% of the thickness of the textile carrier; in other words, for a carrier having a thickness of 100 µm, it has penetrated over a layer thickness of 25 µm within the carrier, specifically starting from the area of the carrier on which the adhesive is coated, and in a perpendicular direction to the plane formed by the longitudinal and transverse directions respectively.

On account of the positive qualities outlined, the adhesive tape can be used outstandingly for the insulating and wrapping of wires or cables.

The adhesive tape is preferably used for the jacketing of elongate items such as, in particular, cable harnesses, with the adhesive tape being guided in a helical movement around the elongate item. This produces the form of a helix (also called screw, screw line, cylindrical spiral or coil; a helix is a curve which winds with constant gradient around the outside of the cylinder).

In one variant the elongate item is enveloped in an axial direction by the adhesive tape. The wrapping of a cable loom with the adhesive tape described takes place in this case not, in the customary manner, in the form of a helical line, but instead such that, during wrapping, a longitudinal axis of the tape is oriented substantially parallel to the direction in which the cable loom extends. As viewed in cross section, the adhesive tape in this case is in the form of an Archimedean spiral around the cable loom. This type of winding is also called "wrapping of the cable loom".

Likewise embraced by the inventive concept is a jacketed elongate item, such as in particular a cable harness, jacketed with an adhesive tape of the invention, and also a vehicle comprising an elongate item thus jacketed.

According to one embodiment of the invention, the elongate item is a cable strand which comprises a bundle of a plurality of cables such as 3 to 1000 cables, preferably 10 to 500 cables, more particularly between 50 and 300 cables.

On account of the outstanding suitability of the adhesive tape, it can be used in a jacket that consists of a covering where, at least in one edge region of the covering, the self-adhesive tape is present, and is bonded on the covering in such a way that the adhesive tape extends over one of the longitudinal edges of the covering, and preferably in an edge region which is narrow by comparison with the width of the covering.

One such product and also optimized embodiments thereof are disclosed in EP 1 312 097 A1. EP 1 300 452 A2, DE 102 29 527 A1 and WO 2006/108871 A1 show further developments for which the adhesive tape of the invention is likewise very suitable. The adhesive tape of the invention may also find use in a method of the kind disclosed by EP 1 367 608 A2.

Finally, EP 1 315 781 A1 and also DE 103 29 994 A1 describe embodiments of adhesive tapes of a kind also possible for the adhesive tape of the invention.

In order to ensure the proper application of the adhesive tape particularly on cable looms, there may be at least one marker line extending in the longitudinal direction on the top side of the carrier. Two marker lines are preferred. These marker lines differ visually and/or haptically from the surface surrounding them.

The marking is applied to the carrier, by printing, for example. Alternatively or additionally, however, it is possible for the marking to be incorporated in the first carrier. For instance, the marking may be realized as a warp thread incorporated by weaving, so to speak. EP 3 245 265 A1 describes the use of a marker line of this kind on an adhesive tape.

In order to enable particularly simple operation for the user, there are perforations in the adhesive tape, in particular aligned at right angles to the running direction of the adhesive tape and/or arranged at regular intervals.

This perforation serves primarily as a tearing aid for removal to the specified length. No perforations should be present in the section of adhesive tape jacketing the item, so as not to have any adverse effects on the shielding properties.

The perforations can be produced in a particularly advantageous way either discontinuously, using flat dies or cross-running perforating wheels, or continuously, using rotary systems such as spike rollers or punch rollers, optionally with the use of a counter-roller (Vulkollan roller) forming the counter-wheel during cutting.

Further possibilities include cutting technologies which operate intermittently in a controlled manner, such as the use of lasers, ultrasound or high-pressure water jets, for example, and so on. Where, in the case of laser cutting or ultrasound cutting, some of the energy is introduced into the carrier material in the form of heat, it is possible to melt the fibres in the cutting region, thereby very largely preventing disruptive fraying, and producing sharply contoured cut edges. Latter methods are also suitable for obtaining specific cut-edge geometries, such as concave or convex cut edges, for example.

The adhesive tape can be employed flexibly on different cable diameters.

The proper application of the adhesive tape can be verified simply and reliably by means of the advantageous marking.

The adhesive tape of the invention may be applied in the customary and known operations in the context of cable bandaging.

BRIEF DESCRIPTION OF THE DRAWINGS

The intention of the text below is to illustrate the adhesive tape in more detail with reference to a number of figures, without thereby wishing to impose any kind of restriction at all.

In the figures.

Figure 1:
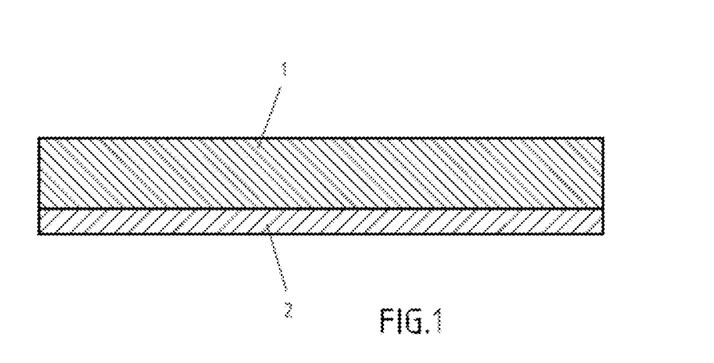
FIG. 1 shows the adhesive tape in a lateral section.

Shown in FIG. 1, in a section in the cross direction (transverse section), is the adhesive tape, consisting of a woven fabric carrier 1, one side of which bears an applied layer of a self-adhesive coating 2 based on an acrylate dispersion.

The adhesive has been absorbed to an extent of 20% into the carrier, thus resulting in optimum anchoring and at the same time improving the hand tearability of the carrier.

Figure 2:
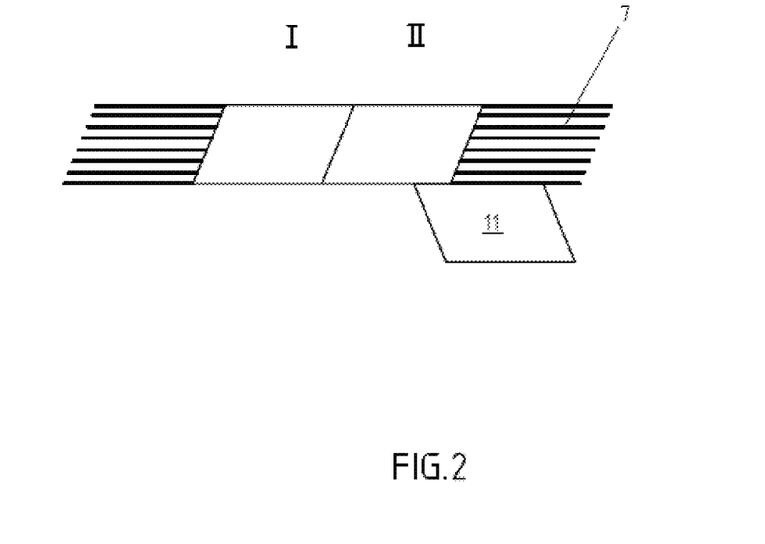
FIG. 2 shows a detail of a cable loom which is composed of a bundle of individual cables and is jacketed with the adhesive tape of the invention.

FIG. 2 shows a detail of a cable loom which is composed of a bundle of individual cables 7 and is jacketed with the adhesive tape 11 of the invention. The adhesive tape is passed in a helicoidal movement around the cable loom.

The detail of the cable loom shown has two turns I and II of the adhesive tape. Further turns will extend toward the left, but are not shown here.

Figure 3:
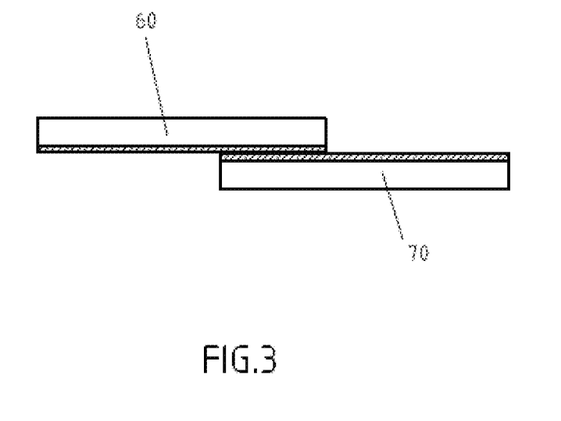
FIG. 3 shows an advantageous application of the adhesive tape.

In a further embodiment for jacketing, two tapes 60, 70 of the invention, furnished with an adhesive, are laminated with their adhesives at an offset (preferably by 50% in each case) to one another, producing a product as shown in FIG. 3.

EXAMPLES

Outline of the Examples

The adhesive tape of the invention is described below in a preferred embodiment by means of an example, without wishing thereby to subject the invention to any restriction whatsoever.

In addition, a comparative example is given, which shows an adhesive tape that displays significantly poorer performance.

An acrylate-based example PSA is applied to a nonwoven carrier, to give an adhesive surface weight of 55 g/m$^2$.

The nonwoven is a stitchbonded nonwoven of Maliwatt type with a basis weight of 72 g/m$^2$, consisting of PET fibres with a length of 64 mm and a thickness of 3 den and of a PET stitching thread with a linear density of 50 dtex, stitched at 22 threads per inch (corresponding to 9 threads/centimetre of nonwoven width).

In the case of the inventive example B2, the PET fibres consist 50 wt % of recycled PET fibres and 50 wt % of non-recycled PET fibres; in the inventive example 3 they consist 79 wt % of recycled PET fibres and 21 wt % of non-recycled PET fibres; and in the case of the comparative example (B1) they consist 100 wt % of non-recycled PET fibres.

|    |                    | Abrasion resistance of unprocessed carrier | Storage |            | Peel adhesion, steel | Peel adhesion to rear | Unwind force 0.3 m/min | Unwind force 30 m/min | Ultimate tensile strength |
|----|--------------------|--------------------------------------------|---------|------------|----------------------|-----------------------|------------------------|-----------------------|---------------------------|
|    |                    | 5 mm mandrel [double strokes]              | Weeks   | Temp. [° C.] | [N/cm]             | [N/cm]                | [N/cm]                 | [N/cm]                | [N/cm]                    |
| B1 | Standard           | 5                                          | Fresh   |            | 3                    | 4.4                   | 1.7                    | 5.9                   | 36                        |
|    |                    |                                            | 4 wk    | 40         | 2.9                  | 5.4                   | 1.6                    | 6.1                   |                           |
| B2 | 50% recycled PET   | 7                                          | Fresh   |            | 3.3                  | 4.7                   | 1.5                    | 6.0                   | 32                        |
|    |                    |                                            | 4 wk    | 40         | 2.9                  | 4.9                   | 2.1                    | 5.7                   |                           |
| B3 | 79% recycled PET   | 8                                          | Fresh   |            | 3.1                  | 4.5                   | 1.7                    | 5.5                   | 36                        |
|    |                    |                                            | 4 wk    | 40         | 3.2                  | 5.3                   | 1.7                    | 6                     |                           |

-continued

| | | Elongation at break [%] | Noise attenuation analogously to VW60360 [dB(A)] | Abrasion resistance of tape analogously to ISO6722; 7N; 5 mm rod diameter [double strokes] | Flagging (SWAT) 1 mm ETFE cable 30 d RT | Flagging (SWAT) 1 mm ETFE cable 30 d 40° C. | Thermal short-term ageing analogously to VW60360, 130° C. |
|---|---|---|---|---|---|---|---|
| B1 | Standard | 20 | 6.1 | 37 | 1 / 3 | 0 / 13 | Test passed |
| B2 | 50% recycled PET | 20 | 6 | 49 | 0 / 0 / 0 | 0 / 8 | Test passed |
| B3 | 79% recycled PET | 22 | 6.4 | 58 | 0 / 0 / 1 | 0 / 5 | Test passed |

While the majority of technical and applications tests show a comparable performance spectrum, it is notable that, unexpectedly, a textile carrier wherein the fibres consist of recycled fibres scores better abrasion values than a carrier which uses non-recycled fibres. Moreover, it is evident with the flagging as well, described here as the Single Wire Application Test (SWAT test), that after a test period of 30 days at 40° C., entirely surprisingly, a significantly reduced lifting of the adhesive tape is apparent, becoming evident after accelerated ageing of the rolls for 4 weeks at 40° C.

Assessment Criteria

Implementation of the Tests

Unless expressly stated otherwise, the measurements are carried out under test conditions of 23±1° C. and 50±5% relative humidity.

Measurement of Flagging Resistance by the SWAT Method

The SWAT test is utilized in order to investigate the flagging behaviour of adhesive tapes after they have been wound spirally around a cable.

The test is carried out under standard conditions (23±1° C. and 50±5% relative humidity) and at 40° C. The elevated temperature simulates the more difficult requirements during transport.

The test uses an adhesive tape 19 mm wide. It is wound manually around a cable jacketed with ETFE (ethylene-tetrafluoroethylene) and having a diameter of 1 mm, four times) (1440°, without additional pressure. Scissors are used to cut the adhesive tape.

A flag on average 5 mm long is assumed to remain unless the end of the adhesive tape is pressed down.

A total of seven turns around the cable are produced.

Figure 4:
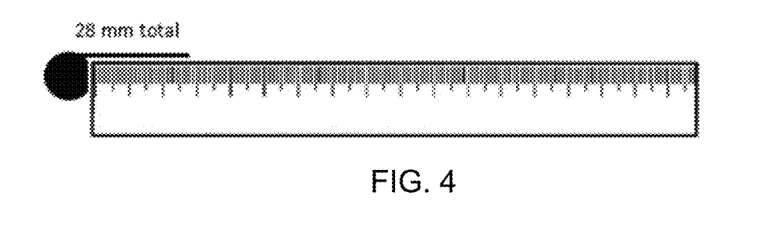
FIG. 4 depicts a ruler for measuring flags.

The flags are measured with a ruler after three days, ten days and 30 days under standard conditions. This is shown by FIG. 4. The absolute flagging value is computed by subtracting 5 mm from the flag length actually measured.

In FIG. 4, therefore, the flagging value is 23 mm (28 mm-5 mm).

The flagging value reported as the result is the result of the mean flagging values of the seven turns. The test at 40° C. is carried out analogously in customary drying cabinets.

The adhesive tape of the invention is evaluated subsequently at 40° C. in a drying cabinet by the SWAT method specified.

Measurement of the Peel Adhesion to Steel and to Tape Reverse

The measurement takes place analogously to the measurement method indicated in the proposed amendment to VW 60360-1, meaning that the test takes place on the one hand, in accordance with DIN EN 1939, to steel (method 1, 180° testing) and on the other hand to the tape reverse (method 2, 180° testing).

Unwind Force

The unwind force is measured according to the proposed amendment to VW 60360-1 "Protected systems for wiring harnesses-Adhesive Tapes": 2019-10 at a take-off rate of 0.3 m/min and 30 m/min, respectively.

Measurement of the noise attenuation according to the proposed amendment to VW 60360-1 *"Protected systems for wiring harnesses-Adhesive Tapes"*: 2019-10 The noise attenuation is measured according to the proposed amendment to VW 60360-1 "Protected systems for wiring harnesses-Adhesive Tapes": 2019-10.

Thermal Short-Term Ageing

The thermal short-term ageing is measured according to the proposed amendment to VW 60360-1 "Protected systems for wiring harnesses-Adhesive Tapes": 2019-10. The measurements are made in each case at 130° C. (temperature class B).

Softening Point

The softening point is understood to be the temperature (or temperature range) at which amorphous or semicrystalline polymers undergo transition from the glassy, hard-elastic state into a soft state. The reduction in the hardness of such substances at the softening point becomes clearly apparent, for example, in that a body placed under load onto a sample of substance is impressed into this sample when the softening point is reached.

The softening point is fundamentally above the glass transition temperature, but for the majority of polymers is well below the temperature at which they undergo complete transition into the liquid state.

The softening point is measured according to ASTM E28-99 (2009), known as Ring & Ball methodology (R&B).

Measurement of Glass Transition Temperatures

The glass transition temperatures were measured on the DSC 204 F1 "Phönix" Dynamic Scanning calorimeter from Netzsch, Germany, in 25 μl aluminium crucibles with a perforated lid, under a nitrogen atmosphere (20 m$^1$/min gas flow rate). The initial sample mass was 8±1 mg. The samples were measured twice from −140° C. to 200° C. with a heating rate of 10 K/min. The subject of analysis was the 2nd heating curve.

The method is based on DIN 53 765.

Dynamic Viscosity Measurement

The viscosity measurement is carried out with a DSR 200 N rheometer from Rheometric Scientific at room temperature and in rotation mode at a shear rate of 0.01 s$^{-1}$ using a cone-plate system having a diameter of 25 mm, and alternatively with a shear rate of 10 s$^{-1}$.

Gel Content

The gel content is determined by Soxhlet extraction, which extracts soluble constituents from polymers in a continuous extraction. In the case of determination of the gel content of (aqueous) polyacrylate PSAs, a suitable solvent such as tetrahydrofuran, for example, extracts the soluble fractions of a polymer—the so-called sol—from the insoluble fractions—the so-called gel. Preparation: the composition for extraction is applied to siliconized release paper as a thin film-generally with a layer thickness of 120 μm—and dried for around 12 h at 80° C. (forced-air drying cabinet). The films are kept in a desiccator over desiccant. The Whatman 603 extraction sleeves are dried at 80° C. for 12 h, the empty weight of the sleeves is ascertained, and they are stored in a desiccator prior to use.

Gel Content Determination

Around 1 g of PSA is weighed into an extraction sleeve. A 100 ml round-bottom flask of the Soxhlet apparatus is filled with 60 ml of tetrahydrofuran and heated to boiling. THF vapours ascend through the vapor tube of the Soxhlet apparatus and condense in the condenser, and THF drips into the extraction sleeve and extracts the sol fraction. In the course of the extraction, the THF I runs back into the flask with the extracted sol. Dissolved sol accumulates increasingly in the flask. After 72 h of continuous extraction, the sol is completely dissolved in the THF. After cooling of the apparatus to room temperature, the extraction sleeve is then removed and dried at 80° C. over 12 h. The sleeves are kept in the desiccator until their mass is constant, after which they are weighed.

The gel content of the polymer is calculated according to the following formula:

$$\text{Gel content} = \frac{m_3 - m_1}{m_2 - m_1} \cdot 100\%$$

where $m^1$: mass of extraction sleeve, empty
$m^2$: mass of extraction sleeve+polymer
$m^3$: mass of extraction sleeve+gel Flexural Stiffness The flexural stiffness is determined using a Softometer KWS basic 2000 mN (from Wolf Messtechnik GmbH). (MD) stands for machine direction, meaning that the flexural stiffness is determined in the machine direction.

The invention claimed is:

1. An adhesive tape comprising a textile carrier and a pressure-sensitive adhesive applied on at least one side of the carrier, where starting materials used for the textile carrier comprise fibres of recycled polyethylene terephthalate, where a fraction of the fibres is at least 50 wt % and where the fibres are staple fibres or continuous filaments or are processed to form yarns.

2. Adhesive tape according to claim 1,
wherein
the fraction of the fibres in the textile carrier is more than 50 wt %.

3. Adhesive tape according to claim 1,
wherein
the fraction of the fibres in the textile carrier is 100 wt %.

4. Adhesive tape according to claim 1,
wherein
the carrier is a textile carrier.

5. Adhesive tape according to claim 1,
wherein
the textile carrier material comprises stitchbonded fabrics, these being textile sheetlike structures which are produced by looping of incorporated knitting threads into a sheetlike base material.

6. Adhesive tape according to claim 1,
wherein
the textile carrier material comprises knit-bonded nonwovens, these being textile sheetlike structures which are produced, without using threads, by formation of fibre loops from primary fibre nonwoven.

7. Adhesive tape according to claim 1,
wherein
the textile carrier material comprises stitchbonded nonwovens in the form of Maliwatts.

8. Adhesive tape according to claim 1,
wherein
the carrier is woven fabric and is constructed as follows:
a) a thread count in a warp is 10 to 60/cm;
b) a thread count in a weft is 10 to 40/cm;
c) warp threads possess a yarn weight of between 40 and 400 dtex; and
d) weft threads possess a yarn weight of between 40 and 660 dtex.

9. Adhesive tape according to claim 1,
which
has an adhesive coatweight, based on an area of the carrier, is between 40 and 160 g/m².

10. Adhesive tape according to claim 1,
wherein
the adhesive comprises a self-adhesive coating.

11. A method of jacketing an elongate item comprising guiding an adhesive tape according to claim 1 in a helical line around the elongate item.

12. A method for jacketing an elongate item comprising enveloping the elongate item in an axial direction by an adhesive tape according to claim 1.

13. An elongate item jacketed with an adhesive tape according to claim 1.

14. A vehicle comprising a jacketed elongate item according to claim 13.

* * * * *